United States Patent [19]
Hosoya et al.

[11] Patent Number: 5,950,994
[45] Date of Patent: Sep. 14, 1999

[54] VIBRATION ISOLATING APPARATUS

[75] Inventors: Nobuyuki Hosoya, Isezaki; Kenichi Tsuchiya, Kiryu; Masaaki Sonoda, Yokohama, all of Japan

[73] Assignee: Bridgestone Corporation, Tokyo, Japan

[21] Appl. No.: 08/979,184

[22] Filed: Nov. 26, 1997

Related U.S. Application Data

[63] Continuation of application No. 08/555,837, Nov. 13, 1995, abandoned.

[30] Foreign Application Priority Data

Nov. 14, 1994 [JP] Japan ................................ 6-279583

[51] Int. Cl.$^6$ ........................................................ F16F 5/00
[52] U.S. Cl. ...................... 267/140.13; 267/219; 248/562
[58] Field of Search ............................ 267/140.11, 140.13, 267/219, 35, 141; 180/300, 312; 248/562, 636

[56] References Cited

U.S. PATENT DOCUMENTS

| | | | |
|---|---|---|---|
| 4,215,842 | 8/1980 | Brenner et al. | ................ 267/140.13 X |
| 4,288,063 | 9/1981 | Brenner et al. | ................ 267/140.13 X |

FOREIGN PATENT DOCUMENTS

| | | |
|---|---|---|
| A-57-77223 | 5/1982 | Japan . |
| U-1-148137 | 10/1989 | Japan . |

Primary Examiner—Robert J. Oberleitner
Assistant Examiner—Robert A. Siconolfi
Attorney, Agent, or Firm—Oliff & Berridge, PLC

[57] ABSTRACT

A vibration isolating apparatus includes a first mounting member; a second mounting member having a through hole; an elastic body provided to be elastically deformable and mounted in such a manner as to be interposed between the first mounting member and the second mounting member; a liquid chamber of which at least a portion of a partition wall is formed of the elastic body and the second mounting member and which is filled with a liquid; and an elastic membrane provided to be elastically deformable and fixed to a portion of the second mounting member forming the partition wall of the liquid chamber so as to cover the through hole. Accordingly, even when vibration of a high frequency which cannot be damped by the elastic body and a liquid is transmitted from the side of a vibration-generating portion, the elastic membrane elastically deforms and the dynamic spring constant becomes low. As a result, vibration is not easily transmitted to the side of a vibration-receiving portion.

12 Claims, 5 Drawing Sheets

VIBRATION ISOLATING APPARATUS

This is a Continuation of application Ser. No. 08/555,837 filed Nov. 13, 1995 now abandoned.

BACKGROUND OF THE INVENTION

1. Field of the Invention

The present invention relates to a vibration isolating apparatus which, for example, is used to prevent transmission of vibration from a vibration generating portion, and particularly to a vibration isolating apparatus which is applicable to, for example, an engine mount for preventing transmission of engine vibration to a vehicle body, other vehicles, a general industrial machine or the like.

2. Description of the Related Art

Heretofore, a vibration isolating apparatus used as an engine mount is disposed between an engine which is a vibration generating portion of a vehicle and a vehicle body which is a vibration receiving portion. In such a vehicle, the vibration isolating apparatus absorbs vibration generated by the engine and prevents the vibration from being transmitted to the vehicle body.

As an example of this type of vibration isolating apparatus, there has been known a vibration isolating apparatus 110 as shown in FIG. 4. The vibration isolating apparatus 110 is described below with reference to FIG. 4.

The vibration isolating apparatus 110 is constructed as follows. A rubber elastic body 116 is disposed between a top plate 112 and a bottom plate 114. Further, a liquid chamber 118 filled with liquid is provided inside of the elastic body 116 and is divided into a pair of liquid chambers 118A, 118B by a rubber membrane 120, and an orifice 122 causes these liquid chambers 118A, 118B to communicate with each other. When the engine mounted on the vibration isolating apparatus 110 operates and vibration is generated, vibration is absorbed by damping force which is generated by a damping function of the elastic body 116, deformation of the membrane 120, viscous resistance of a liquid within the orifice 122 provided for communication between the liquid chambers 118A, 118B, or the like. As a result, transmission of vibration is prevented.

However, in the above-described vibration isolating apparatus 110, although vibration in a low frequency range is damped by the orifice 122, the membrane 120, or the like, when vibration is a higher frequency range is transmitted to the vibration isolating apparatus 110, the orifice 122 becomes clogged or the membrane 120 may not sufficiently deform. For this reason, an internal pressure within the liquid chamber 118A increases and a spring constant increases. As a result, there is a drawback in that vibration cannot be sufficiently reduced.

SUMMARY OF THE INVENTION

In view of the above-described circumstances, it is an object of the present invention to provide a vibration isolating apparatus which is capable of efficiently absorbing vibrations of a wide range of frequencies.

In accordance with one aspect of the present invention, there is provided a vibration isolating apparatus comprising: a first mounting member connected to one of a vibration-generating portion and a vibration-receiving portion; a second mounting member connected to another of the vibration-generating portion and the vibration-receiving portion and having a through hole; an elastic body provided to be elastically deformable and mounted in such a manner as to be interposed between the first mounting member and the second mounting member; a liquid chamber of which at least a portion of a partition wall is formed of the elastic body and the second mounting member and which is filled with a liquid; and an elastic membrane fixed to a portion of the second mounting member which forms the partition wall of the liquid chamber while covering the through hole, a portion of the elastic membrane corresponding to the through hole being provided to be elastically deformable.

The above-described vibration isolating apparatus has the following operation.

When vibration is transmitted from the side of the vibration-generating portion connected to one of the first mounting member and the second mounting member, the elastic body deforms and the change of pressure occurs in the liquid within the liquid chamber. For this reason, vibration is damped by internal friction of the elastic body caused by deformation thereof and viscous resistance of the flowing liquid, so that vibration is not easily transmitted to the side of the vibration-receiving portion.

Further, a through hole is provided in a portion of the second mounting member forming the partition wall of the liquid chamber and the elastic membrane is fixed to the second mounting member so as to cover the through hole. For this reason, even when the frequency of vibration generated by the vibration-generating portion varies and vibration of a high frequency which cannot be damped by the elastic body and the liquid is transmitted from the side of the vibration-generating portion, the elastic membrane elastically deforms and a dynamic spring constant becomes low. In this case as well, vibration is not easily transmitted to the side of the vibration-receiving portion.

In accordance with another aspect of the present invention, there is provided a vibration isolating apparatus comprising: a first mounting member connected to one of a vibration-generating portion and a vibration-receiving portion; a second mounting member connected to another of the vibration-generating portion and the vibration-receiving portion and having a plurality of through holes; an elastic body provided to be elastically deformable and mounted in such a manner as to be interposed between the first mounting member and the second mounting member; a liquid chamber of which at least a portion of a partition wall is formed of the elastic body and the second mounting member and which is filled with a liquid; and an elastic membrane fixed to a portion of the second mounting member which forms the partition wall of the liquid chamber while covering the plurality of through holes, portions of the elastic membrane corresponding to the plurality of through holes being provided to be elastically deformable.

The above-described vibration isolating apparatus has the following operation.

This vibration isolating apparatus has the same operation as that of the previously-described aspect of the vibration isolating apparatus. However, in this aspect of the vibration isolating apparatus, a plurality of through holes are provided in the second mounting member and the elastic membranes are fixed to the second mounting member so as to respectively cover the plurality of through holes.

Accordingly, when the plurality of through holes are formed to have different sizes, respective portions of the elastic membrane corresponds to vibrations of different frequencies and the dynamic spring constant can be lowered in a wide range of vibration frequencies. For this reason, it is possible to reduce vibrations in a still wider range of frequencies.

DESCRIPTION OF THE PREFERRED EMBODIMENTS

Figure 1:
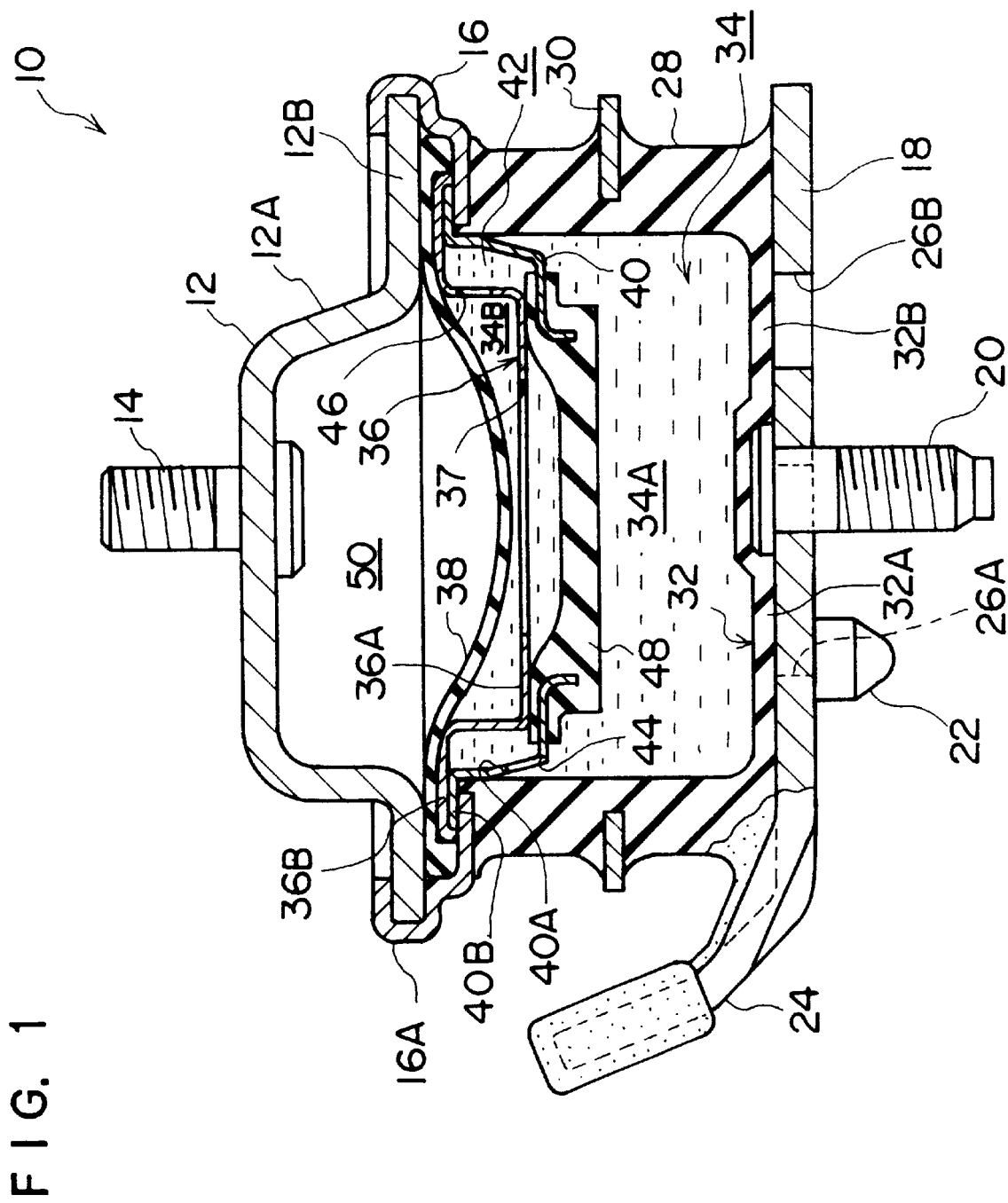
FIG. 1 is a cross-sectional view of a vibration isolating apparatus according to an embodiment of the present invention, which is taken along the lines 1—1 shown in FIG. 2.
Figure 2:
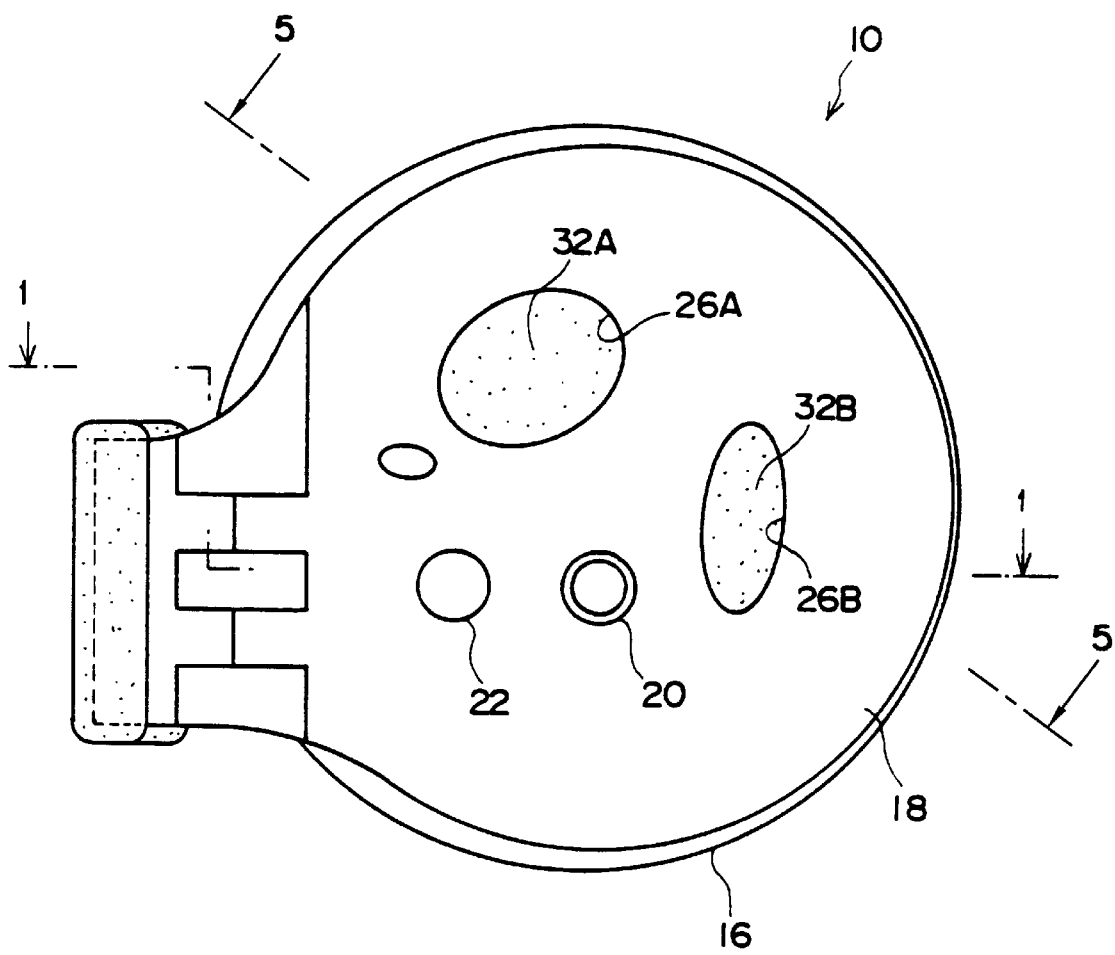
FIG. 2 is a bottom view of the vibration isolating apparatus according to the embodiment of the present invention.
Figure 3:
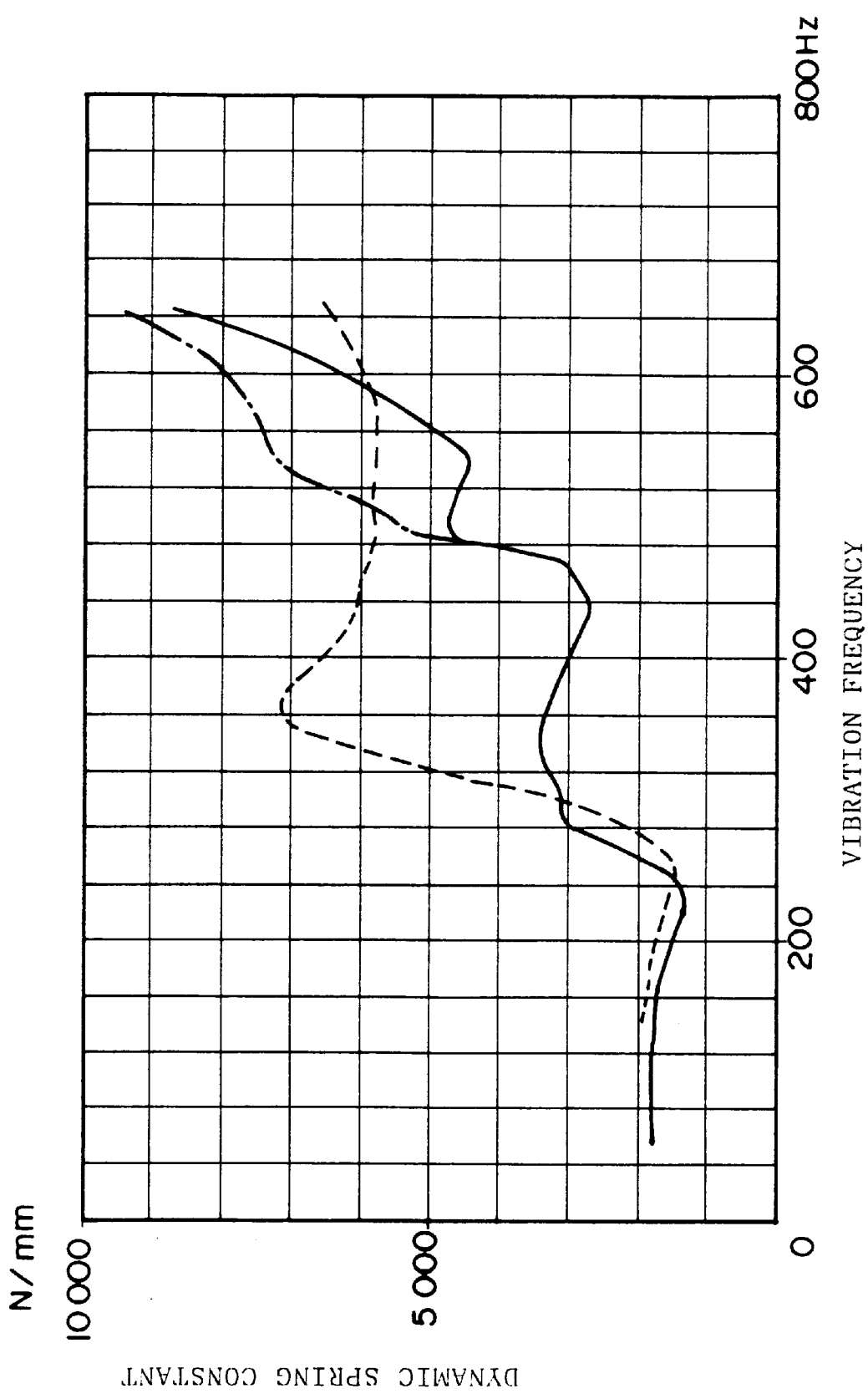
FIG. 3 is a graph showing the comparison between a characteristic of the vibration isolating apparatus according to the embodiment and a characteristic of a conventional vibration isolating apparatus.
Figure 4:
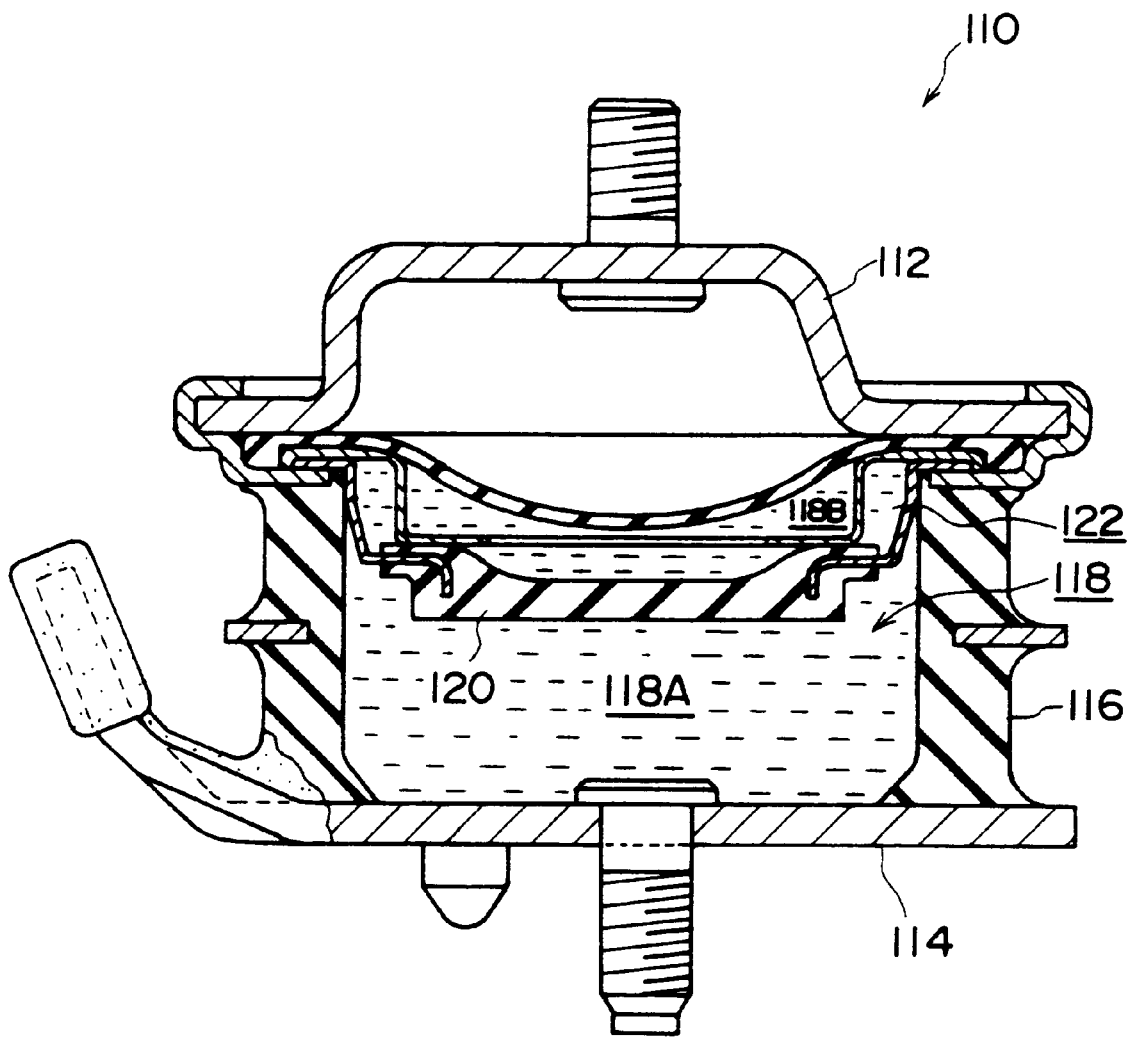
FIG. 4 is a cross-sectional view of a conventional vibration isolating apparatus.

Referring now to FIGS. 1 through 3, a description will be given of a vibration isolating apparatus according to an embodiment of the present invention.

As shown in FIG. 1 and FIG. 2 respectively showing the cross-sectional views of the present embodiment, a bolt 14 projects from the center of an upper portion of a top plate hardware 12 made of a steel plate, which forms an upper side of a vibration isolating apparatus 10. The bolt 14 is used to connect and fix the vibration isolating apparatus 10 to an unillustrated engine. A portion of the top plate hardware 12 near the circumference thereof is formed in a tapered vertical wall 12A, and a flange portion 12B projects from a lower end portion of the vertical wall 12A toward the outer periphery of the top plate hardware 12.

A support ring 16 made of a steel plate is disposed at a lower portion of the top plate hardware 12 in FIG. 1. An outer peripheral side of the support ring 16 forms a flange portion 16A made higher than an inner peripheral side of the support ring 16 by one step. An outer peripheral end of the flange portion 16A is calked to the flange portion 12B of the top plate hardware 12 and the support ring 16 and the top plate hardware 12 are fixed to each other.

As described above, the top plate hardware 12 and the support ring 16 make a pair to form a first mounting member. The flange portion 16A of the support ring 16 and the flange portion 12B of the top plate hardware 12 form a joint portion for connecting the support ring 16 and the top plate hardware 12 with each other.

On the other hand, a bolt 20 and an engaging pin 22 respectively project downward from the center of a lower portion of a bottom plate hardware 18 made of a steel plate. The bottom plate hardware 18 forms a lower side of the vibration isolating apparatus 10 to serve as a second mounting member. The bolt 20 is used to connect the bottom plate hardware 18 to an unillustrated sub-frame of a vehicle body in a thread-fastening manner and the engaging pin 22 is used to position the bottom plate hardware 18 to the vehicle body in an engaging manner.

As shown in FIG. 2, a plurality of through holes 26A, 26B (in this embodiment, two through holes are illustrated) are formed in the substantially disk-shaped bottom plate hardware 18 in such a manner as to pass through the bottom plate hardware 18 from an upper surface to a lower surface thereof. These through holes 26A, 26B have different sizes and the through hole 26B is formed smaller than the through hole 26A.

Further, a left-side end (in FIG. 1) of the bottom plate hardware 18 is formed so as to project therefrom and this projecting portion bends upward to form a stopper 24. For this reason, excessive movement of the vibration isolating apparatus 10 with respect to lateral vibration is prevented by the stopper 24.

A rubber elastic body 28 having a cylindrical shape is disposed between the bottom plate hardware 18 and the support ring 16. Namely, an upper surface of the elastic body 28 is adhered by vulcanization to a bottom surface of the support ring 16 and a lower surface of the elastic body 28 is adhered by vulcanization to an upper surface of the bottom plate hardware 18.

A ring-shaped reinforcing hardware 30 is disposed in an intermediate portion of the elastic body 28 in the vertical direction in a state of being adhered by vulcanization to the elastic body 28. Further, a rubber elastic membrane 32 connected to the elastic body 28 covers a portion at the side of an upper surface of the bottom plate hardware 18 and at the side of an inner periphery of the elastic body 28 in such a manner that the elastic membrane 32 is adhered by vulcanization thereto. Accordingly, each upper surface of the plurality of through holes 26A, 26B is covered with the elastic membrane 32.

Namely, the elastic membrane 32 provided above the through hole 26A is an elastic membrane 32A and the elastic membrane 32 provided above the through hole 26B is an elastic membrane 32B. Respective areas of the elastic membranes 32A, 32B are different from each other in correspondence with each size of the through holes 26A, 26B and the elastic membrane 32B whose area is smaller than that of the elastic membrane 32A is formed so as to have a higher rigidity.

Meanwhile, the top plate hardware 12, the support ring 16, the top plate hardware 18 and the elastic body 28 form a main part of the vibration isolating apparatus 10. A rubber diaphragm 38 whose outer peripheral portion is held between the flange portion 12B of the top plate hardware 12 and the flange portion 16A of the support ring 16 is disposed to cover an upper portion of the elastic body 28.

A liquid chamber 34 is provided between the bottom plate hardware 18 and the elastic body 28, and the diaphragm 38 and is formed by respective inner wall surfaces of the above-described members. The liquid chamber 34 is filled with liquid such as water, oil, or the like.

Moreover, a disk-shaped partition wall plate 36 is disposed within the liquid chamber 34. A central portion of the partition wall plate 36 forms a flat plate portion 36A formed into a flat plate and having an opening portion 37 at the center of the flat plate portion 36A. Further, a flange-shaped supporting portion 36B as a grip is formed at an outer peripheral side of the flat plate portion 36A of the partition wall plate 36 and at a position higher than the flat plate portion 36A by one step with a cylindrical portion disposed between the flat plate portion 36A and the supporting portion 36B.

A ring-shaped orifice forming member 40 having a stepped portion 40A disposed near an outer periphery of the orifice forming member 40 is positioned at a lower side of the partition wall plate 36. A flange-shaped supporting portion 40B of the orifice forming member 40 is bonded to the supporting portion 36B of the partition wall plate 36. Accordingly, the partition wall plate 36 and the orifice forming member 40 form a partition wall member.

A rubber membrane 48 is disposed at the side of an inner periphery of the ring-shaped orifice forming member 40 in a state of being adhered by vulcanization to the orifice forming member 40. For this reason, the membrane 48 is adapted to divide the liquid chamber 34 into a pressure-receiving liquid chamber 34A and a sub-liquid chamber 34B forming a pair of liquid chambers. Meanwhile, although the sub-liquid chamber 34B is formed so as to be divided into two parts by the partition wall plate 36, these two parts communicate with each other by the large opening portion 37 of the partition wall plate 36 and the sub-liquid chamber 34B is substantially formed in an integral structure.

An orifice 42 which is a ring-shaped space is provided between the partition wall plate 36 and the stepped portion 40A of the orifice forming member 40. An unillustrated closing plate is provided in a portion of the orifice 42. A small hole 44 for causing the pressure-receiving liquid chamber 34A and the orifice 42 to communicate with each other and a small hole 46 for causing the sub-liquid chamber 34B and the orifice 42 to communicate with each other are respectively formed in the orifice 42 at opposite sides thereof with the closing plate interposed therebetween. Accordingly, the orifice 42 and the small holes 44, 46 cause the pressure-receiving liquid chamber 34A and the sub-liquid chamber 34B to communicate with each other.

On the other hand, the supporting portion 36B of the partition wall plate 36 projecting outward and the supporting portion 40B of the orifice forming member 40 are, together with an outer peripheral portion of the diaphragm 38, held between the flange portion 12B of the top plate hardware 12 and the flange portion 16A of the support ring 16. For this reason, the partition wall plate 36, the orifice forming member 40 and the diaphragm 38 are fixed between the top plate hardware 12 and the support ring 16. In addition, a space between the diaphragm 38 and the top plate hardware 12 serves as an air chamber 50, which enables deformation of the diaphragm 38.

Next, an operation of the present embodiment will be described.

When the engine mounted on the top plate hardware 12 operates, vibration of the engine is transmitted to the elastic body 28 via the top plate hardware 12. The elastic body 28 functions as a vibration-absorbing main body to absorb vibration by its damping function based on internal friction of the elastic body 28. Further, the pressure-receiving liquid chamber 34A expands and contracts in correspondence with deformation of the elastic body 28 and the change of pressure occurs in the liquid within the pressure-receiving liquid chamber 34A. With the change of pressure, a liquid flows reciprocatingly between the pressure-receiving liquid chamber 34A and the sub-liquid chamber 34B which is capable of expanding and contracting by the diaphragm 38, via the orifice 42. Thus, vibration is further absorbed by a damping function based on viscous resistance of the liquid in the orifice 42 and a vibration isolating effect can be improved.

Further, even when the vibration frequency increases and the orifice becomes clogged, as shown by the characteristic of the vibration isolating apparatus 10 of the present embodiment, which is indicated by the solid line in FIG. 3, the dynamic spring constant becomes low with respect to vibration of a frequency of 200 Hz or thereabouts due to deformation of the membrane 48. For this reason, an increase in fluid pressure within the pressure-receiving liquid chamber 34A is prevented and the vibration isolating effect is maintained, so that vibration is not easily transmitted to the vehicle body.

On the other hand, the elastic membrane 32A covers the through hole 26A provided in a portion of the bottom plate hardware 18 forming a part of the partition wall of the pressure-receiving liquid chamber 34A. Further, there is a possibility that, when a frequency of vibration generated by the engine changes, high frequency vibration of, for example, 400 Hz or thereabouts, which cannot be damped by the elastic body 28, the membrane 48 and viscous resistance of a liquid, may be transmitted from the engine side. However, even in this case, the elastic membrane 32A provided above the through hole 26A elastically deforms, and as indicated by the solid line in FIG. 3, the dynamic spring constant becomes lower in comparison with the characteristic of the conventional vibration isolating apparatus 10 indicated by the broken line in FIG. 3. Accordingly, the vibration isolating effect is maintained and vibration is not easily transmitted to the vehicle body.

The elastic membrane 32B covers the through hole 26B formed smaller than the through hole 26A and provided in a portion of the bottom plate hardware 18 forming a part of the partition wall of the pressure-receiving liquid chamber 34a. Accordingly, when vibration of a higher frequency of, for example, 500 Hz or thereabouts, such that the elastic deformation of the elastic membrane 32A of the through hole 26A cannot cause the dynamic spring constant to become low, is transmitted from the engine side, the elastic membrane 32B of the through hole 26B, whose rigidity is higher than the elastic membrane 32A deforms elastically. For this reason, as compared with the case in which the through hole 26B is not provided, the case being indicated by the dot-chain line in FIG. 3, the dynamic spring constant becomes lower as indicated by the solid line in FIG. 3. As a result, the vibration isolating effect is maintained and vibration is not easily transmitted to the vehicle body.

As described above, these elastic membranes 32A, 32B covering two through holes 26A, 26B respectively correspond to vibrations of different frequencies so that the dynamic spring constant is made lower. For this reason, it is possible to reduce vibration of a wide range of frequencies.

With the structure of the present embodiment, high frequency vibration can be reduced by utilizing the elastic membrane 32 extending from the elastic body 28. Accordingly, there is no possibility that the manufacturing cost of the vibration isolating apparatus 10 increase, and vibration isolating performance can be improved at a low cost. Meanwhile, the elastic membrane 32 may be formed separately from the elastic body 28.

In the above-described embodiment, two through holes 26A, 26B are formed in the bottom plate hardware 18, but one through hole, or three or more through holes may also be applied to the present invention.

However, when a plurality of through holes are formed, as shown in the present embodiment, respective elastic membranes 32 covering the through holes are provided to have different rigidities. This structure is constructed in that the respective elastic membranes are resonated sequentially from the elastic membrane having the lowest rigidity and the dynamic spring constant is lowered over a wide range of vibrations from a low frequency to a high frequency.

Figure 5:
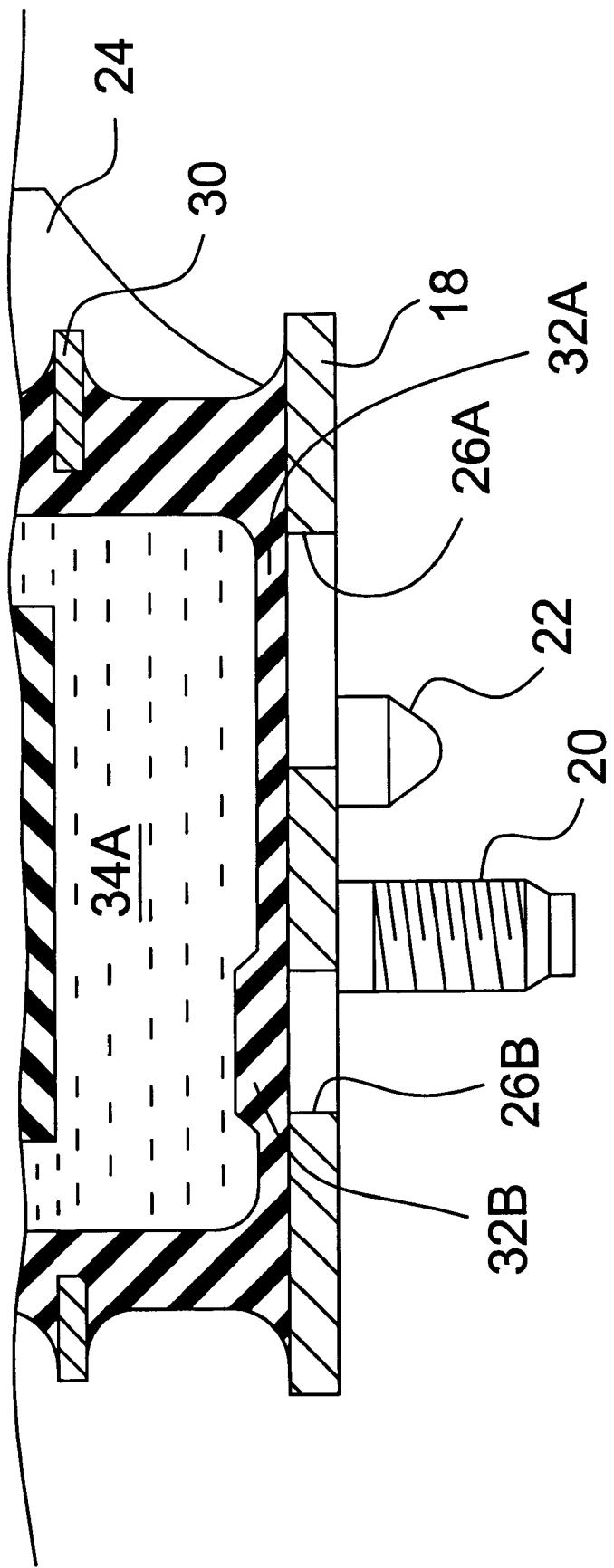
FIG. 5 is a partial cross-sectional view of the vibration isolating apparatus taken along lines 5—5 shown in FIG. 2.

In this case, when the thickness of the elastic membrane is varied for each of the through holes, the elastic membranes have different rigidities even when the through holes have the same size. For this reason, unlike the above-described embodiment in which a plurality of through holes having different sizes are provided, it is also possible to lower the dynamic spring constant in a wide range of vibration frequencies by varying the thickness of the elastic membrane for each of the through holes (FIG. 5).

The above-described embodiment is constructed in that the orifice 42 and the membrane 48 are provided. However, in place of the orifice 42 and the membrane 48, for example, a movable piece which is not adhered and can move reciprocatingly may be disposed between the pressure-receiving liquid chamber 34A and the sub-liquid chamber 34B. Further, there may also be used a vibration isolating apparatus in which the orifice 42, the membrane 48, the movable piece, and the like are not provided.

Moreover, excessive deformation of the elastic membrane 32 due to input of excessive amplitude by vibration can be reduced in such a manner that the elastic membrane 32 is caught by a sub-frame at the side of the vehicle body to which the bottom plate hardware 18 is fixed, and deformation of the elastic membrane 32 is limited in a fixed range, and therefore, durability of the elastic membrane 32 can be maintained.

Meanwhile, the partition wall plate 36 and the orifice forming member 40 are respectively formed by press working or the like of steel plates, but may also be formed by integral molding of a metal such as synthetic resin, aluminium or the like. Further, the present embodiment is constructed in that the side of the top plate hardware 12 serving as the first mounting member is connected to the engine and the side of the bottom plate metallic parts 18 serving as the second mounting member is connected to the vehicle body. However, a reversely-connected structure may also be applied to the present invention.

In the above-described embodiment, the vibration isolating apparatus of the present invention is used to isolate vibration of the engine mounted on the vehicle, but may be of course used for other purposes. Further, the shape or the like of each member is not limited to that of the present embodiment.

Since the vibration isolating apparatus of the present invention is constructed as described above, it becomes possible to efficiently absorb vibration of a wide range of frequencies.

What is claimed is:

1. A vibration isolating apparatus, comprising:
    a first mounting member rigidly connected to one of a vibration-generating portion and a vibration-receiving portion;
    a second mounting member rigidly connected to another of the vibration-generating portion and the vibration-receiving portion and having a plurality of through holes;
    an elastic body provided to be elastically deformable and mounted in such a manner as to be interposed between said first mounting member and said second mounting member;
    a liquid chamber of which at least a portion of a wall of said liquid chamber is formed of said elastic body and said second mounting member and which is filled with a liquid; and
    an elastic membrane fixed to a portion of said second mounting member which forms a portion of the wall of said liquid chamber while covering the plurality of through holes, the elastic membrane a continuation of said elastic body so as to be a unitary structure, portions of said elastic membrane corresponding to the plurality of through holes being provided to be elastically deformable, wherein a portion of said elastic membrane extending over a through hole of the plurality of through holes has a different rigidity than the portion of said elastic membrane extending over any other through hole of the plurality of through holes.

2. A vibration isolating apparatus according to claim 1 wherein the plurality of through holes formed in said second mounting member have different sizes.

3. A vibration isolating apparatus according to claim 2, wherein respective portions of said elastic membrane covering the plurality of through holes have the same thickness, the differences of hole size producing the different rigidity.

4. A vibration isolating apparatus according to claim 1, wherein respective portions of said elastic membrane covering the plurality of through holes have different thicknesses to provide the different rigidity.

5. A vibration isolating apparatus, comprising:
    a first mounting member rigidly connected to one of a vibration-generating portion and a vibration-receiving portion;
    a second mounting member rigidly connected to another of the vibration-generating portion and the vibration-receiving portion and having a plurality of through holes;
    an elastic body provided to be elastically deformable and mounted in such a manner as to be interposed between said first mounting member and said second mounting member;
    a liquid chamber of which at least a portion of a wall of said liquid chamber is formed of said elastic body and said second mounting member and which is filled with a liquid;
    a partition wall member disposed within said liquid chamber so that said liquid chamber is divided into a pair of small liquid chambers and having an orifice connecting the pair of small liquid chambers with each other; and
    an elastic membrane extending from said elastic body and fixed to a portion of said second mounting member which forms a portion of the wall of said liquid chamber while covering the plurality of through holes, the elastic membrane a continuation of said elastic body so as to be a unitary structure, portions of said elastic membrane being provided to be elastically deformable, the portions of the elastic membrane covering the plurality of through holes each having a different rigidity.

6. A vibration isolating apparatus according to claim 5, wherein a membrane made of rubber is disposed at a portion of said partition wall member where the pair of small liquid chambers are divided.

7. A vibration isolating apparatus according to claim 5 wherein respective portions of said elastic membrane covering the plurality of through holes have the same thickness and each through hole of the plurality of through holes has a different size to provide the different rigidity.

8. A vibration isolating apparatus according to claim 5, wherein at least a portion of a partition wall of one of the pair of small liquid chambers formed by dividing said liquid chamber is formed of said elastic body and at least a portion of a partition wall of another of the pair of small liquid chambers is formed of a diaphragm.

9. A vibration isolating apparatus according to claim 5, wherein said elastic body and said elastic membrane are respectively formed of rubber materials.

10. A vibration isolating apparatus according to claim 5, wherein the orifice of said partition wall member is formed into a ring-shaped configuration.

11. A vibration isolating apparatus according to claim 5, wherein said partition wall member is formed in such a manner that a pair of members each formed by press working of a steel plate are adhered to each other.

12. A vibration isolating apparatus according to claim 5, wherein each through hole of the plurality of through holes has the same size and a portion of the elastic membrane has a different thickness over each through hole of the plurality of through holes to provide the different rigidity.

* * * * *